United States Patent
Rehman

(10) Patent No.: US 9,715,670 B2
(45) Date of Patent: Jul. 25, 2017

(54) INDUSTRIAL IDENTIFY ENCODING AND DECODING LANGUAGE

(75) Inventor: Samuelson Rehman, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1291 days.

(21) Appl. No.: 11/871,829

(22) Filed: Oct. 12, 2007

(65) Prior Publication Data

US 2009/0096608 A1    Apr. 16, 2009

(51) Int. Cl.
| | | |
|---|---|---|
| G08B 13/14 | (2006.01) | |
| G08B 1/00 | (2006.01) | |
| G06Q 10/08 | (2012.01) | |
| G06Q 10/06 | (2012.01) | |

(52) U.S. Cl.
CPC ........... *G06Q 10/087* (2013.01); *G06Q 10/06* (2013.01); *G06Q 10/08* (2013.01)

(58) Field of Classification Search
USPC ...................... 455/456.1; 340/10.1; 33/456.1
See application file for complete search history.

(56) References Cited

U.S. PATENT DOCUMENTS

| | | | |
|---|---|---|---|
| 5,365,516 A | 11/1994 | Jandrell | |
| 6,600,418 B2 | 7/2003 | Francis et al. | |
| 6,832,251 B1 | 12/2004 | Gelvin et al. | |
| 6,843,415 B2 | 1/2005 | Vogler | |
| 7,000,834 B2 | 2/2006 | Hind et al. | |
| 7,295,132 B2 | 11/2007 | Steiner | |
| 7,403,120 B2 | 7/2008 | Duron et al. | |
| 7,633,387 B2 | 12/2009 | Carmichael et al. | |
| 7,800,499 B2 | 9/2010 | Rehman | |
| 8,042,737 B2 | 10/2011 | Rehman | |
| 8,099,737 B2 | 1/2012 | Rehman | |
| 9,202,357 B2 | 12/2015 | Rehman | |
| 2002/0111819 A1 | 8/2002 | Li et al. | |
| 2003/0009398 A1 | 1/2003 | Lin et al. | |
| 2003/0115072 A1* | 6/2003 | Manucha et al. | 705/1 |
| 2003/0144985 A1 | 7/2003 | Ebert | |
| 2003/0227392 A1 | 12/2003 | Ebert et al. | |
| 2004/0090472 A1* | 5/2004 | Risch et al. | 345/853 |
| 2004/0093479 A1 | 5/2004 | Ramchandran | |
| 2004/0243636 A1* | 12/2004 | Hasiewicz et al. | 707/104.1 |
| 2004/0249590 A1* | 12/2004 | Ota et al. | 702/79 |
| 2005/0177466 A1 | 8/2005 | Willins | |
| 2005/0204014 A1* | 9/2005 | Yao et al. | 709/217 |

(Continued)

OTHER PUBLICATIONS

U.S. Appl. No. 11/685,655, Final Office Action mailed on Dec. 22, 2010, 10 pages.

(Continued)

*Primary Examiner* — Brian Zimmerman
*Assistant Examiner* — Cal Eustaquio
(74) *Attorney, Agent, or Firm* — Invoke

(57) ABSTRACT

In various embodiments, a method for processing industrial identifiers includes receiving unstructured data. An encoding scheme is determined for the unstructured data based on an execution tree associated with a plurality of industrial identifiers. The encoding scheme is then output to an application. Data may be received for one or more fields associated with one of the plurality of industrial identifiers. An industrial identifier may be generated based on the execution tree in response to the data.

21 Claims, 10 Drawing Sheets

(56) References Cited

U.S. PATENT DOCUMENTS

| | | | |
|---|---|---|---|
| 2006/0022801 A1 | 2/2006 | Husak et al. | |
| 2006/0023679 A1 | 2/2006 | Twitchell | |
| 2006/0033608 A1 | 2/2006 | Juels et al. | |
| 2006/0080732 A1 | 4/2006 | Ohkubo et al. | |
| 2006/0092072 A1 | 5/2006 | Steiner | |
| 2006/0144940 A1 | 7/2006 | Shannon et al. | |
| 2006/0170565 A1 | 8/2006 | Husak et al. | |
| 2006/0181397 A1 | 8/2006 | Limbachiya | |
| 2006/0184980 A1 | 8/2006 | Cole | |
| 2006/0187031 A1 | 8/2006 | Moretti et al. | |
| 2006/0230276 A1 | 10/2006 | Nochta | |
| 2007/0008129 A1 | 1/2007 | Soliman | |
| 2007/0093991 A1* | 4/2007 | Hoogenboom | 702/188 |
| 2007/0174146 A1 | 7/2007 | Tamarkin et al. | |
| 2007/0208445 A1 | 9/2007 | Gibson et al. | |
| 2007/0210916 A1* | 9/2007 | Ogushi et al. | 340/531 |
| 2007/0219916 A1 | 9/2007 | Lucas | |
| 2007/0229229 A1* | 10/2007 | Nelson et al. | 340/10.41 |
| 2007/0257857 A1 | 11/2007 | Marino et al. | |
| 2007/0260428 A1 | 11/2007 | Anderson et al. | |
| 2007/0283005 A1* | 12/2007 | Beliles et al. | 709/224 |
| 2008/0005287 A1* | 1/2008 | Harvey et al. | 709/220 |
| 2008/0024268 A1 | 1/2008 | Wong et al. | |
| 2008/0030335 A1 | 2/2008 | Nishida et al. | |
| 2008/0041950 A1* | 2/2008 | Michels | G06Q 20/342 235/419 |
| 2008/0052201 A1 | 2/2008 | Bodin et al. | |
| 2008/0099557 A1 | 5/2008 | James | |
| 2008/0224866 A1 | 9/2008 | Rehman | |
| 2008/0224867 A1 | 9/2008 | Rehman | |
| 2008/0302871 A1 | 12/2008 | Rehman | |
| 2008/0303667 A1 | 12/2008 | Rehman | |
| 2008/0307435 A1 | 12/2008 | Rehman | |
| 2009/0005916 A1* | 1/2009 | Wainwright et al. | 701/3 |
| 2009/0065579 A1* | 3/2009 | Grant et al. | 235/385 |
| 2010/0029299 A1* | 2/2010 | Riise et al. | 455/456.1 |

OTHER PUBLICATIONS

U.S. Appl. No. 11/685,655, Final Office Action mailed on Mar. 15, 2012, 11 pages.
U.S. Appl. No. 11/685,655, Final Office Action mailed on Mar. 7, 2013, 12 pages.
U.S. Appl. No. 11/685,655, Final Office Action mailed on Dec. 9, 2013, 14 pages.
U.S. Appl. No. 11/685,655, Non-Final Office Action mailed on Sep. 30, 2011, 10 pages.
U.S. Appl. No. 11/685,655, Non-Final Office Action mailed on Sep. 14, 2012, 13 pages.
U.S. Appl. No. 11/685,655, Non-Final Office Action mailed on Jul. 18, 2013, 13 pages.
U.S. Appl. No. 11/685,655, Non-Final Office Action mailed on Jul. 8, 2010, 8 pages.
U.S. Appl. No. 11/685,673, Final Office Action mailed on Nov. 2, 2010, 13 pages.
U.S. Appl. No. 11/685,673, Final Office Action mailed on Feb. 10, 2014, 14 pages.
U.S. Appl. No. 11/685,673, Final Office Action mailed on Sep. 16, 2009, 16 pages.
U.S. Appl. No. 11/685,673, Final Office Action mailed on Jan. 11, 2013, 17 pages.
U.S. Appl. No. 11/685,673, Non Final Office Action mailed on Aug. 26, 2013, 12 pages.
U.S. Appl. No. 11/685,673, Non-Final Office Action mailed on May 11, 2010, 12 pages.
U.S. Appl. No. 11/685,673, Non-Final Office Action mailed on Aug. 3, 2012, 12 pages.
U.S. Appl. No. 11/685,673, Non-Final Office Action mailed on Apr. 10, 2009, 8 pages.
U.S. Appl. No. 11/758,527, Final Office Action mailed on Mar. 7, 2011, 17 pages.
U.S. Appl. No. 11/758,527, Non-Final Office Action mailed on Sep. 30, 2010, 13 pages.
U.S. Appl. No. 11/758,527, Notice of Allowance mailed on Sep. 16, 2011, 16 pages.
U.S. Appl. No. 11/758,532, Final Office Action mailed on Dec. 16, 2009, 17 pages.
U.S. Appl. No. 11/758,532, Non-Final Office Action mailed on Jun. 23, 2009, 13 pages.
U.S. Appl. No. 11/758,532, Notice of Allowance mailed on Jun. 11, 2010, 20 pages.
U.S. Appl. No. 11/758,538, Final Office Action mailed on Jul. 24, 2009, 11 pages.
U.S. Appl. No. 11/758,538, Final Office Action mailed on Aug. 4, 2010, 20 pages.
U.S. Appl. No. 11/758,538, Non-Final Office Action mailed on Feb. 19, 2010, 15 pages.
U.S. Appl. No. 11/758,538, Non-Final Office Action mailed on Mar. 18, 2011, 5 pages.
U.S. Appl. No. 11/758,538, Non-Final Office Action mailed on Mar. 31, 2009, 7 pages.
U.S. Appl. No. 11/758,538, Notice of Allowance mailed on Jul. 22, 2011, 7 pages.
U.S. Appl. No. 11/685,655, Restriction Requirement mailed on Mar. 26, 2010, 6 pages.
U.S. Appl. No. 11/685,655, Non-Final Office Action mailed on Aug. 28, 2014, 6 pages.
U.S. Appl. No. 11/685,655, Notice of Allowance mailed on May 12, 2014, 11 pages.
U.S. Appl. No. 11/685,655, Notice of Allowance mailed on Mar. 6, 2015, 9 pages.
U.S. Appl. No. 11/685,673, Advisory Action mailed on Dec. 2, 2009, 3 pages.
U.S. Appl. No. 11/685,673, Advisory Action mailed on Apr. 24, 2014, 3 pages.
U.S. Appl. No. 11/685,673, Non-Final Office Action mailed on Jul. 20, 2015, 21 pages.
U.S. Appl. No. 11/758,532, Advisory Action mailed on Feb. 26, 2010, 3 pages.
U.S. Appl. No. 11/758,538, Advisory Action mailed on Oct. 13, 2009, 3 pages.
Final Office Action for U.S. Appl. No. 11/685,673, mailed on Jan. 6, 2016, 18 pages.

* cited by examiner

```
800
<?XML VERSION='1.0'?>    805
<ENCODINGS DEFAULTROOT="ROOT">    810

<!-- HEADER ================================================ -->
        <ENCODING NAME="ROOT" INPUTFIELDS='RAW:128'>    815
                <!-- CHECK 2 BIT HEADERS -->
                <VAR NAME='HEADER' LENGTH='2'/>    835
                <SWITCH NAME='HEADER'>
                        <CASE VALUE='10'>                    840
                                <GOTO LABEL='SGTIN-64'/>
                        </CASE>
                        <CASE VALUE='*'>
                                <!-- NOW CHECK LONG HEADER -->
                                <VAR NAME='HEADER' OFFSET='0' LENGTH='8'/>
                                <SWITCH NAME='HEADER'>
                                        <CASE VALUE='00110101'>          845
                                                <GOTO LABEL='GID-96'/>
                                        </CASE>
                                        ...
                                        <CASE VALUE='*'>
                                                <ERROR MESSAGE='NO MATCHING HEADER'/>
                                        </CASE>
                                </SWITCH>
                        </CASE>
                </SWITCH>
        </ENCODING>

820
        <!-- GID 96 ================================================= -->
        <ENCODING NAME='GID-96' LENGTH='96'
URN='URN:EPC:ID:GID:%COMPANY%.%CLASS%.%SERIAL%' INPUTFIELDS='COMPANY,CLASS,SERIAL'>
                <ENCODEVAR NAME='HEADER' VALUE='00110101' />
                <VAR NAME='COMPANY'    LENGTH='28'/>
                <VAR NAME='CLASS'      LENGTH='24'/>
                <VAR NAME='SERIAL'     LENGTH='30'/>
        </ENCODING>                                         850

825
        <!-- SGTIN-64&96 ============================================ -->
        <ENCODING NAME='SGTIN-64' LENGTH='64' URN='URN:EPC:ID:SGTIN-
64:%COMPANY%.%CLASS%.%SERIAL%' INPUTFIELDS='FILTER,COMPANY,CLASS,SERIAL'>
                <ENCODEVAR NAME='HEADER' VALUE='10' />
                <VAR NAME='FILTER' LENGTH='3'/>
                <VAR NAME='COMPANY' LENGTH='14'/>
                <VAR NAME='CLASS'   LENGTH='20'/>
                <VAR NAME='SERIAL'  LENGTH='25'/>
        </ENCODING>

<!-- ENCODING METADATA FOR ENCODING TRANSLATIONS AND COMPLIANCE OPERATIONS -->
        <DICTIONARY>    830
                <STANDARD NAME='GID-[\D]+' SERIALUSES='SUPPLIER,PRODUCT'>
                        <SUPPLIER>COMPANY</SUPPLIER>
                        <PRODUCT>CLASS</PRODUCT>
                        <SERIAL>SERIAL</SERIAL>           855
                </STANDARD>
        </DICTIONARY>

</ENCODINGS>
```

FIG. 8

INDUSTRIAL IDENTIFY ENCODING AND DECODING LANGUAGE

CROSS-REFERENCES TO RELATED APPLICATIONS

The present disclosure may be related to the following commonly assigned applications/patents:

This application is related to co-pending U.S. patent application Ser. No. 11/685,655 filed Mar. 13, 2007 and entitled "Virtualization and Quality of Data;"

This application is related to co-pending U.S. patent application Ser. No. 11/685,673 filed Mar. 13, 2007 and entitled "Real-Time and Offline Location Tracking Using Passive RFID Technologies;"

This application is related to U.S. patent application Ser. No. 11/758,538, filed Jun. 5, 2007, now U.S. Pat. No. 8,042,737 and entitled "RFID Key Rotation System;"

This application is related to U.S. patent application Ser. No. 11/758,532, filed Jun. 5, 2007, now U.S. Pat. No. 7,800,499, and entitled "RFID and Sensor Signing Algorithm;" and This application is related to U.S. patent application Ser. No. 13/330,429, filed Dec. 19, 2011, now U.S. Pat. No. 8,413,170 and entitled "Event Processing Finite State Engine and Language," the respective disclosures of these application/patents are incorporated herein by reference in their entirety for all purposes.

BACKGROUND OF THE INVENTION

Embodiments of the present invention generally relate to Radio Frequency Identification (RFID) applications. More specifically, embodiments of the present invention relate to techniques for encoding and decoding industrial identifiers.

Radio Frequency Identification (RFID) is an automatic identification method which relies on the storing and remotely retrieving of data using devices, such as RFID tags or transponders. RFID tags or transponders are also known as proximity, proxy, or contactless cards, because data from an RFID tag can be retrieved without physical contact. Generally, a device, such as an RFID reader, uses radio waves to remotely retrieve a unique identifier stored using the RFID tag when the RFID tag is within proximity of the RFID reader. RFID tags can be attached to or incorporated into a product, animal, or person for the purpose of identification by the RFID reader. RFID readers can be placed on doorways, in train cars, over freeways, mounted on vehicles, and also can be embodied in mobile handheld devices.

RFID technologies have been traditionally implemented in different ways by different manufacturers, although global standards are being developed. Thus, computer applications using RFID are also typically hard-coded to specific RFID devices sold by the same manufacture. One problem with this arrangement is that these computer applications have traditionally been limited to using only the sensor data retrieved from the vendor supplied RFID readers.

Moreover, in order to provide automated shipping and receiving, real-time inventory, automated shipping and received, and real-time security, other types of RFID sensor devices, such as environment sensors (e.g., temperature and humidity sensors), location sensors (e.g., Global Positioning System or GPS devices), and notification devices, may be required. Accordingly, with the addition of each sensor device, a specific application may be required to access the sensor data from the sensor device. This vendor lock-in leads to having too many non-integrated applications, creates unnecessary complexity, and also increases costs associated with the management and deployment of RFID technologies.

One solution is to embed the sensor device with the RFID tag. For example, one cold chain solution provides an RFID tag embedded with a temperature sensor. Cold chain refers to a temperature-controlled supply chain. An unbroken cold chain is an uninterrupted series of storage and distribution activities which maintain a given temperature range. A reader can read both the identifier of the RFID as well as the temperature from the embedded sensor.

However, by embedding sensors with RFID tags, the cost, and complexity associated with each RFID tag increase. Furthermore, computer applications configured to read the sensor data are still tied directly to specific RFID readers. Thus, the only items for which sensor data can be used from those applications are still those that can be tagged and directly sensed using the specific vendor supplied RFID readers.

Accordingly, what is desired are improved methods and apparatus for solving the problems discussed above, while reducing the drawbacks discussed above.

BRIEF SUMMARY OF THE INVENTION

Embodiments of the present invention generally relate to Radio Frequency Identification (RFID) applications. More specifically, embodiments of the present invention relate to techniques for encoding and decoding industrial identifiers.

In short, various embodiments of the present invention enable encoding and decoding of industrial identifiers using an engine and a language that allows a user or administrator to quickly define new encoding schemes. An execution tree, in general, specifies how to encode or decode any particular number of industrial identifiers. The engine may receive raw or unstructured data from sensor devices (e.g., RFID readers/interrogators) and use the execution tree to determine the encoding type and other information from the raw data.

In various embodiments, a method for processing industrial identifier includes receiving unstructured data. An encoding scheme is determined for the unstructured data based on an execution tree associated with a plurality of industrial identifiers. The encoding scheme is output to an application.

In some embodiments, a plurality of fields are received associated with the encoding scheme. One or more of a plurality of fields are then identified in the unstructured data based on the execution tree. A data structure may be generated using the execution tree based on the one or more identified fields in the unstructured data. In one embodiment, a root reference is received associated with the execution tree. The encoding scheme may be determined for the unstructured data based on execution tree comprises initiating one or more operations associated with the execution tree identified by the root reference to determine the encoding scheme for the unstructured data. The root reference may specify a starting point associated with the encoding scheme.

In one embodiment, the one or more operations may include conditional statements. Data may be received for one or more fields associated with one of a plurality of industrial identifier. An industrial identifier may be generated based on the execution tree in response to the data. Input may be received indicative of one or more fields associated with the encoding scheme. Input may be received indicative of one or more operations associated with these encoding scheme. The execution tree may be generated based on the one or more fields and the one or more operations associated with the encoding scheme.

In various embodiments, a system for processing industrial identifiers includes a processor and a memory. The memory is coupled to the processor and configured to store a plurality of code modules which when executed by the processor cause the processor to receive unstructured data, determine an encoding scheme for the unstructured data based on an execution tree associated with a plurality of industrial identifier, and output the encoding scheme to an application.

In some embodiments, a computer program product stored on a computer readable medium for processing industrial identifiers. The computer program product includes code for receiving unstructured data, code for determining an encoding scheme for the unstructured data based on an execution tree associated with a plurality of industrial identifiers, and code for outputting the encoding scheme to an application.

A further understanding of the nature and the advantages of the inventions disclosed herein may be realized by reference of the remaining portions of the specification and the attached drawings.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings.

FIG. 8 represents one example of a specification for generating an execution tree for processing industrial identifiers in one embodiment according to the present invention.

DETAILED DESCRIPTION OF THE INVENTION

Embodiments of the present invention generally relate to sensor technologies and more specifically to techniques for virtualization and quality of sensor data. In order to better understand the present invention, aspects of the environment within which the invention operates will first be described.

In order to better understand the present invention, aspects of the environment within which various embodiments operate will first be described.

Collection of Sensor Data

In various embodiments, methods and systems for collection of sensor data that may incorporate embodiments of the present invention augment enterprise software with RFID and sensor technologies. The methods and systems generally provides a faster reasons loop, greater visibility, an extensible framework, and scalability for the collection of sensor data from a variety of sensor devices and the processing of sensor data by a variety of applications. The systems typically can be deployed in locations where sensor devices can provide better insight into business processes.

In various embodiments, the methods and systems provide localized management and control of sensor devices through an extensible framework and interface. The methods and systems can funnel data sensor and environment data from RFID readers and sensor device, typically located at the periphery of an enterprise, for access by core applications.

Figure 1:
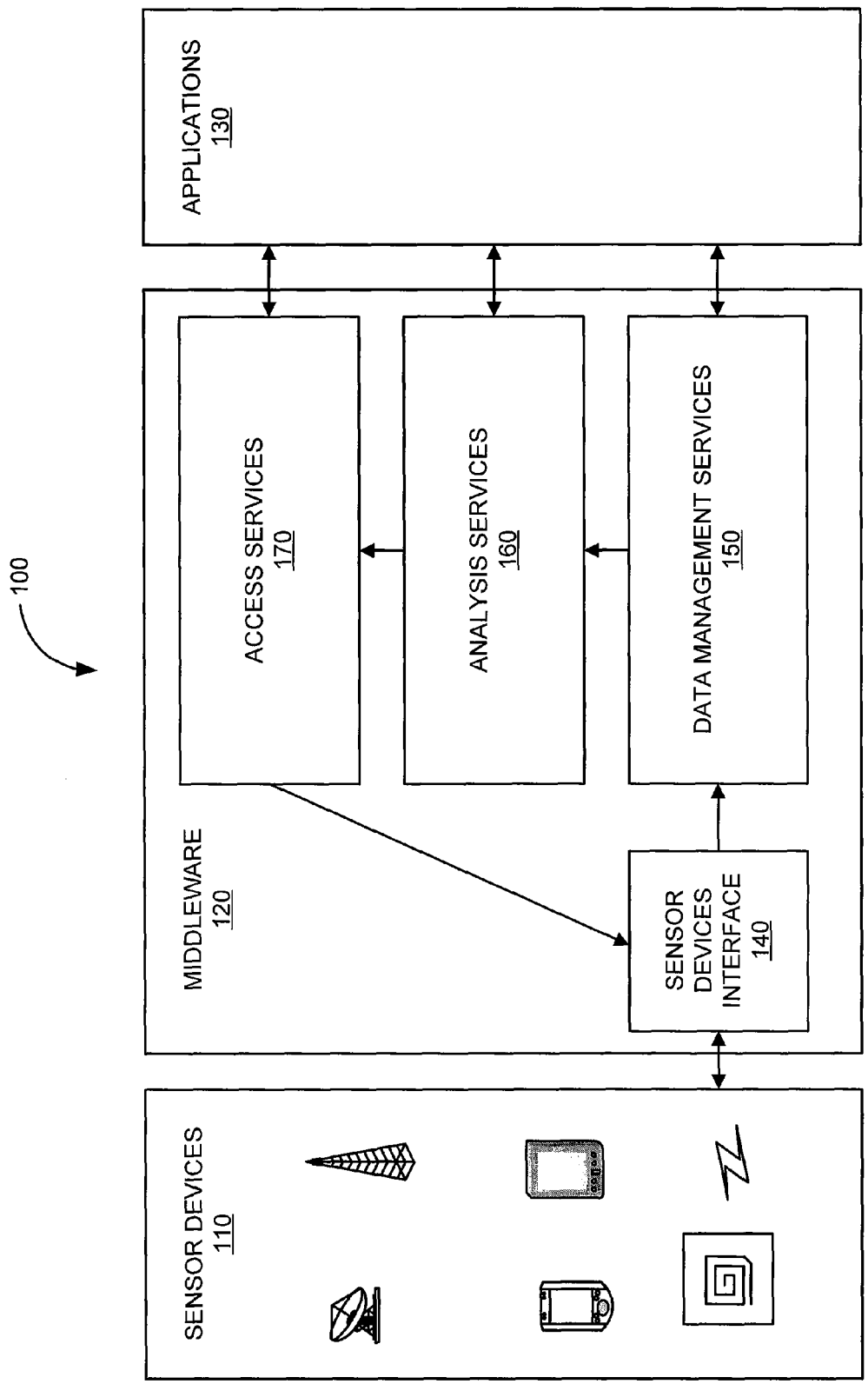
FIG. 1 is a simplified block diagram of a system that may incorporate embodiments of the present invention.

FIG. 1 illustrates a simplified block diagram of a system 100 that may incorporate embodiments of the present invention. FIG. 1 is merely illustrative of an embodiment incorporating the present invention and does not limit the scope of the invention as recited in the claims. One of ordinary skill in the art would recognize other variations, modifications, and alternatives.

As shown in FIG. 1, system 100 includes sensor devices 110, middleware 120, and applications 130. Middleware 120 is communicatively coupled to sensor devices 110 and to applications 130. Middleware 120 includes sensor devices interface 140, data management services 150, analysis service 160, and access services 170.

Sensor devices 110 include contactless cards, transponders, RFID tags, smart labels, fixed interrogators/readers, mobile readers, handheld readers, image capture devices, video captures devices, audio capture devices, environmental sensing devices (e.g., temperature, humidity, and air pressure sensors), location information devices (e.g., Global Positioning System), weight sensing devices, notification and alert generation devices, and the like. One example of an RFID tag is described further with respect to FIG. 2. One example of an RFID reader is described further with respect to FIG. 3. In some embodiments, sensor devices 110 include hardware and/or software elements that respond to external input from middleware 120 to perform actions, manipulate objects, and the like.

In general, middleware 120 includes hardware and/or software elements that provide an interface for using sensor devices 110. In this example, middleware 120 includes sensor devices interface 140, data management services 150, analysis service 160, and access services 170.

Sensor devices interface 140 includes hardware and/or software elements that communicate with sensor devices 110. One example of sensor devices interface 140 is Oracle's Application Server: Sensor Edge Server from Oracle Corporation, Redwood Shores, Calif. In various embodiments, sensor devices interface 140 receives sensor data from sensor devices 110. In some embodiments, sensor devices interface 140 communicates with one or more of sensor devices 110 to provide external input from middleware 120 to cause the one or more of sensor devices 110 to display notifications and alerts, and to perform responses, actions, or activities (e.g., control a conveyor belt or robot).

In general, sensor data is any information, signal, communication, and the like, received from sensor devices 110.

Some examples of sensor data are unique, or semi-unique identifiers associated with RFID tags, temperature information received from a temperature sensor, data and information associated with humidity and pressure, position and location information, still-image data, video sequence data, motion picture data, audio data, and the like.

Data management services 150 include hardware and/or software elements that provide storage of and access to collected sensor data. Some examples of data management services 150 include databases, storage arrays, storage area networks, network attached storage, data security devices, data management devices, and the like.

Analysis services 160 include hardware and/or software elements that provide analysis of collected sensor data. Some examples of analysis which may be performed by analysis services 160 include business intelligence, business process management, inventory management, distribution and supply chain management, accounting, reporting, and the like.

Access services 170 include hardware and/or software elements that provide access to features of middleware 120. In various embodiments, access services 170 include hardware and/or software elements that manage sensor devices 110 through sensor devices interface 140. In some embodiments, access services 170 include hardware and/or software elements provide access to sensor data via data management services 150. In some embodiments, access services 170 include hardware and/or software elements that provide access to analysis services 160. For example, in various embodiments, access services 170 provides one or more users or computer processes with a portal using web services to access sensor data from analysis services 160 and data management services 150. In further embodiments, access services 170 allows the one or more users or computer processes to initiate or coordinate actions or activities using sensor devices 110 through sensor devices interface 140.

Applications 130 include hardware and/or software elements that access sensor data and/or control sensor devices 110 through middleware 120. Some examples of applications 130 are Oracle's E-Business Suite, PeopleSoft Enterprise, and JD Edwards Enterprise from Oracle Corporation, Redwood Shores, Calif.

In one example of operation, system 100 collects sensor data from one or more of sensor devices 110 (e.g., an RFID reader). For example, a plurality of RFID readers detect the presents of a plurality of RFID tags at various times during the movement of objects in a warehouse or at locations in a supply-chain.

In this example, middleware 120 collects the sensor data via sensor devices interface 140, and stores the sensor data using data management services 150. Middleware 120 provides access and analysis of collected and stored sensor data to applications 130 via analysis service 160 and access services 170. Accordingly, system 100 provides a framework for accessing a wide variety of sensor devices to obtain sensor data from a variety of applications.

In various embodiments, system 100 deployed in locations where sensor devices 110 can provide better insight into business processes. System 100 provides greater visibility of sensor data by allowing non-vendor specific applications to have access to sensor data. This extensible framework also provides scalability for the collection of sensor data from a variety of sensor devices. In various embodiments, system 100 provides localized management and control of sensor devices 100 through middleware 130 and sensor devices interface 140.

Figure 2:
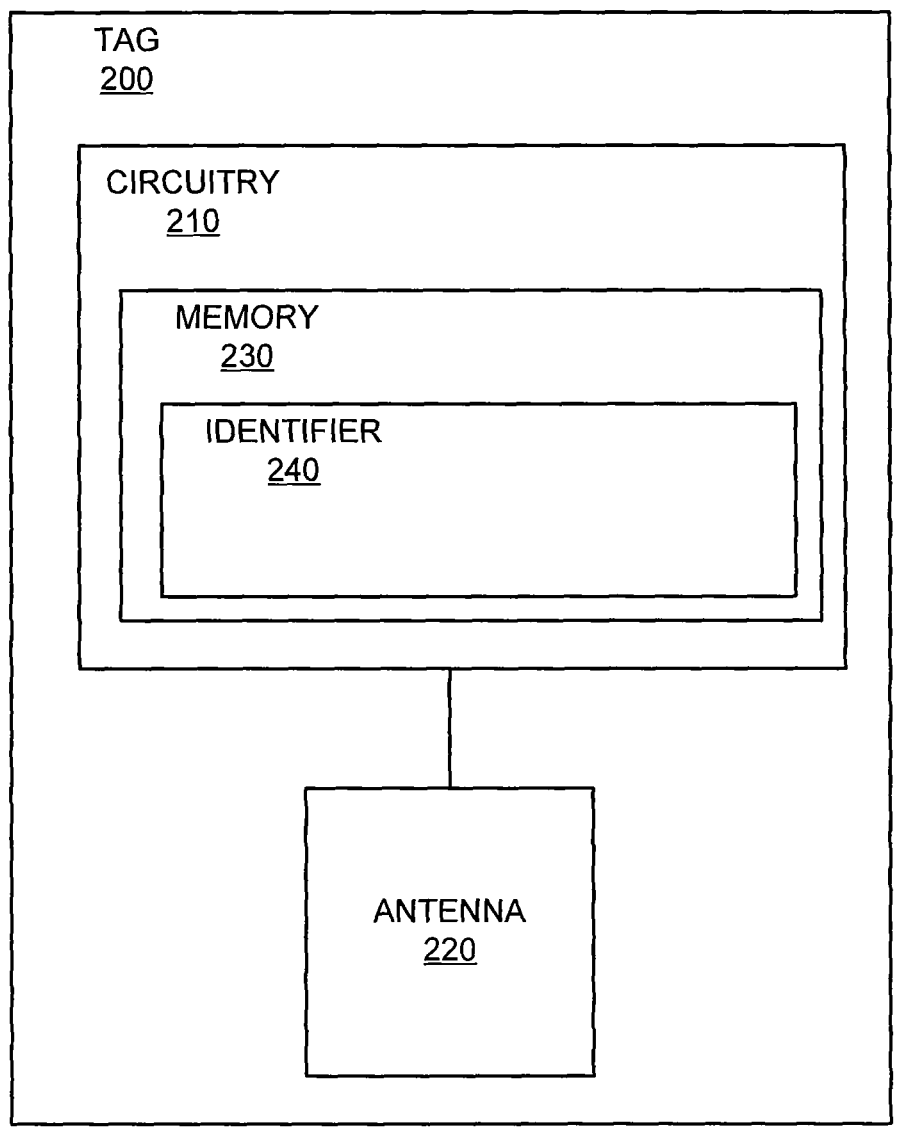
FIG. 2 is a block diagram of a tag in one embodiment according to the present invention.

FIG. 2 is a block diagram of a tag 200 in one embodiment according to the present invention. In this example, tag 200 includes circuitry 210 coupled to an antenna 220. Circuitry 210 includes a memory 230. Memory 230 includes an identifier 240.

In operation, tag 200 typically obtains power to operate circuitry 210 from an inductive coupling of tag 200 to energy circulating around a reader coil (e.g., low frequency, high frequency, very high frequency, and ultra high frequency radio waves). In some embodiments, tag 200 operates in a low frequency (LF) band (e.g., 13.56 MHz). Alternatively, tag 200 may use radiative coupling, such as in ultra-high frequency (UHF) and microwave RFID systems to energize circuitry 210 which in turn communicates data (e.g., identifier 240) stored in memory 230 via antenna 220. Antenna 220 typically is a conductive element that enables circuitry 210 to communicate data.

In general, tag 200 and other contactless cards, smart labels, transponders, and the like, typically use three basic technologies: active, passive, and semi-passive. Active tags typically use a battery to power microchip circuitry and transmit signals to readers. Active tags can generally be read from distances of 100 ft. or more. Passive tags do not include a battery. Instead, passive tags draw power from a magnetic field that is formed by the coupling of an antenna element in the tags with the coiled antenna from a reader. Semi-passive tags are similar to active tags in that they use a battery to run microchip circuitry. However, in semi-passive tags, the battery generally is not used to broadcast a signal to the reader.

In various embodiments, circuitry 210 may include an RF interface and control logic, in addition to memory 230, combined in a single integrated circuit (IC), such as a low-power complementary metal oxide semiconductor (CMOS) IC. For example, the RF interface can be an analog portion of the IC, and the control logic and memory 230 can be a digital portion of the IC. Memory 230 may be a non-volatile read-write memory, such as an electrically erasable programmable read only memory (EEPROM).

In some embodiments, circuitry 210 includes an antenna tuning capacitor and an RF-to-DC rectifier system designed for Antenna 220, which is the coupling element for tag 200. Antenna 210 can enable passive tag 200 using passive RFID to obtain power to energize and active circuitry 210. Antenna 220 can have many different shapes and sizes, depending on the type of coupling system (e.g., RFID) being employed.

Some examples of tag 200 are ISO 11784 & 11785 tags, ISO 14223/1 tags, ISO 10536 tags, ISO 14443 tags, ISO 15693 tags, ISO 18000 tags, EPCglobal, ANSI 371.1, 2 and 3, AAR S918, and the like.

In some embodiments, circuitry 210 of tag 200 is configured to read from and write to memory 230. Identifier 240 is generally a unique serial number. Identifier 240 may also be hard coded into circuitry 210. In some embodiments, information such as a product information and location may be encoded in memory 230 of circuitry 210.

Figure 3:
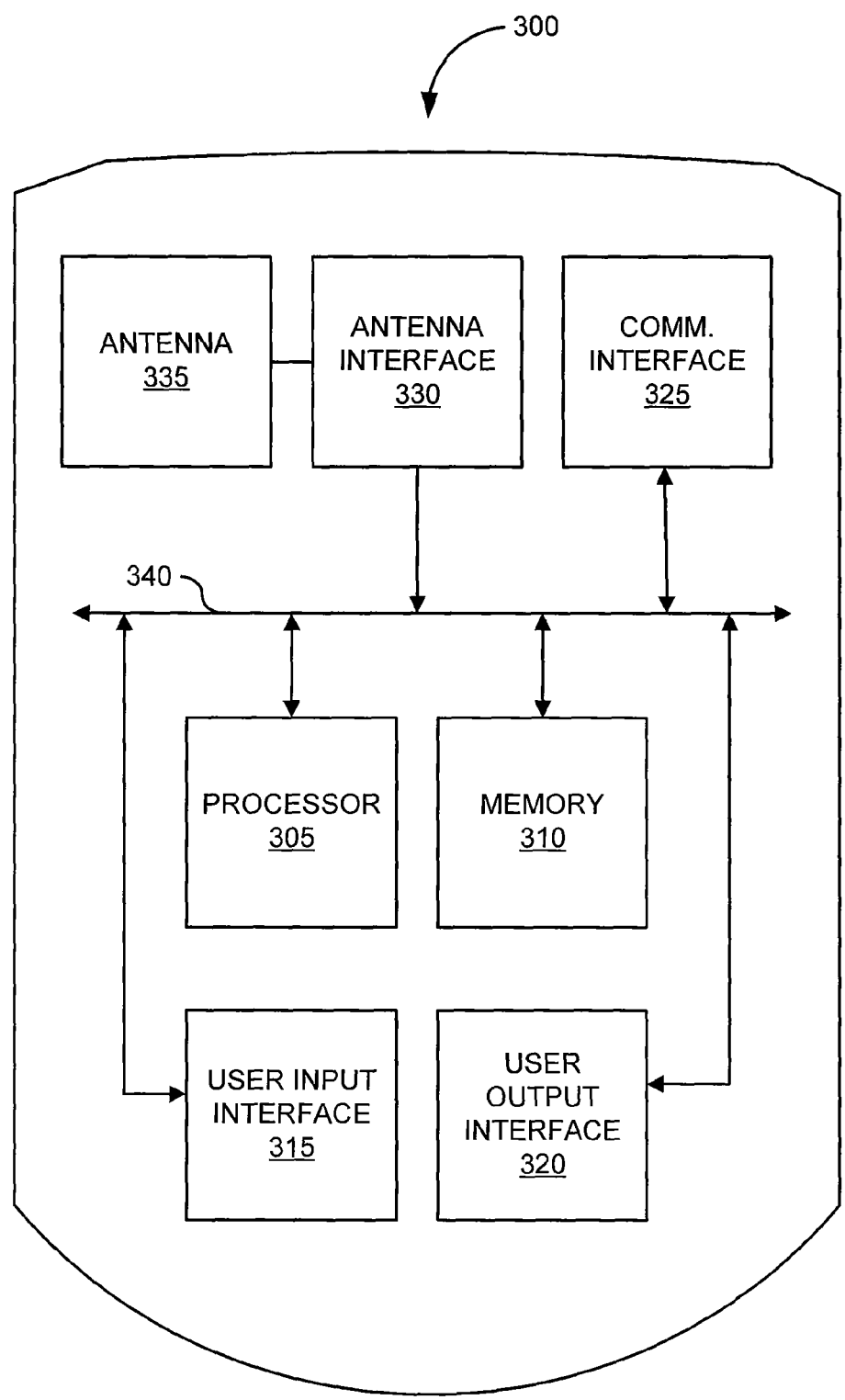
FIG. 3 is a block diagram of an interrogator/reader in one embodiment according to the present invention.

FIG. 3 is a block diagram of an interrogator/reader 300 in one embodiment according to the present invention. In this example, reader 300 includes a processor 305, a memory 310, a user input interface 315, a user output interface 320, a communications interface 325, an antenna interface 330, an antenna 335, and a system bus 340. Processor 305, memory 310, user input interface 315, user output interface 320, communications interface 325, and antenna interface 330 are coupled via system bus 340. Antenna interface 320 is linked to antenna 325.

In this example, reader 300 uses radio frequencies to communicate with tag 200 using antenna 335. For example, when tag 200 is within proximity of reader 300, tag 200 draws power from a magnetic field that is formed by the coupling of antenna 220 from tag 200 with antenna 335 from reader 300. Circuitry 210 from tag 200 then transmits identifier 240 via antenna 220. Reader 300 detects the transmission using antenna 335 and receives identifier 240 through antenna interface 330. In some embodiments, reader 300 stores the identifier 240 in memory 310. Reader 300 may transmit data, including identifier 240, in digital or analog form to sensor devices interface 140 using communications interface 325.

In various embodiments, reader 300 uses low, high, ultra-high, and microwave frequencies to store and retrieve data from products or devices using RFID tags.

Figure 4:
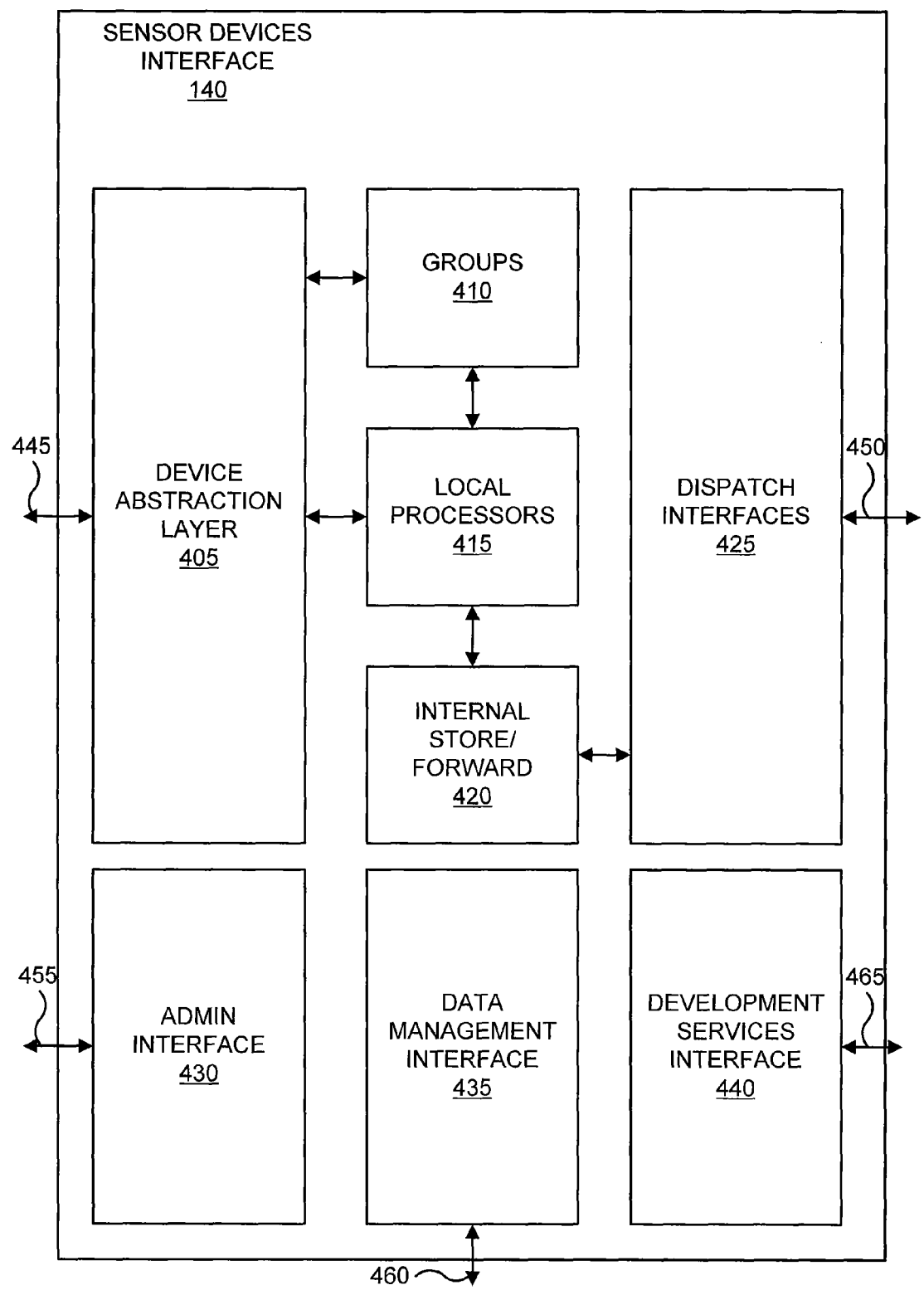
FIG. 4 is a block diagram of a system for interfacing with sensor devices to provide virtualization and quality of data in one embodiment according to the present invention.

FIG. 4 is a block diagram of sensor devices interface 140 for interfacing with sensor devices 110 to provide virtualization and quality of data in one embodiment according to the present invention.

In this example, sensor devices interface 140 includes device abstraction layer 405, groups module 410, local processors 415, internal store/forward module 420, dispatch interfaces 425, administration interfaces 430, data management interface 435, and development services interface 440. Device abstraction layer 405 is linked to groups module 410 and local processors 415. Local processors 415 are linked to groups module 410 and to internal store/forward module 420. Internal store/forward module 420 is link to dispatch interface 425.

Device abstraction layer 405 communicates via line 445 with sensor devices 110 to received collected sensor data and drive operations of one or more of sensor devices 110. Dispatch interface 425 communicates collected sensor data via line 450 with one or more applications, such as analysis services 160 and applications 130. Administration interface 430 is link via line 455 to one or more computers systems that administer the operations of sensor devices interface 140. Data management interface 435 communicates collected sensor data via line 460 with data repositories, such as a database provided by data management services 150. Development services interface 440 communicates via line 465 with applications to provide an Application Program Interface (API) to collected sensor data and operations of one or more of sensor devices 110.

Device abstraction layer 405 includes hardware and/or software elements that received collected sensor data and drive the operations of one or more of sensor devices 110. In one embodiment, device abstraction layer 405 provides a plug-and-play architecture and extendable driver framework that allows applications (e.g., Applications 130) to be device agnostic and utilize various sensors, readers, printers, and notification devices. In some embodiments, device abstraction layer 405 may include out-of-the-box drivers for readers, printers, and display/notification devices from various vendors, such as Alien of Morgan Hill, Calif. and Intermec of Everett, Wash.

Groups module 410 and local processors 415 include hardware and/or software elements that provide a framework for simple, aggregate, and programmable filtering of sensor data received from device abstraction layer 405. For example, using groups module 410, filters executed by local processors 415 are applied to a single device or to logical groups of devices to collect sensor data that satisfies predefined criteria. Local processors 415 include hardware and/or software elements for creating filters and rules using sensor data. Some examples of filters may include Pass Filter, Movement Filter, Shelf Filter, Cross Reader Filter, Check Tag Filter, Pallet Shelf Filter, Pallet Pass Filter, and Debug Filter. In some embodiments, filters and rules may be created using the JavaScript programming language and through the use of regular expressions.

Internal store/forward module 420 includes hardware and/or software elements that provide an interface between local processors 415 and dispatch interfaces 425. In one example, internal store/forward module 420 includes a buffer used for communication between local processors 415 and dispatch interfaces 424. Dispatch interfaces 425 include hardware and/or software elements that disseminate sensor data to applications (e.g., applications 130). In some embodiments, dispatch interfaces 425 include a web services component, an HTTP-dispatcher component, a stream dispatcher component, and an interface supporting subscription or query based notification services.

Administration interface 430 includes hardware and/or software elements that managing operations of sensor devices interface 140. In one example, administration interface 430 provides a task oriented user interface for adding, configuring, and removing devices, creating and enabling filters and rules, and creating and enabling dispatchers that disseminate sensor data.

Data management services 435 include hardware and/or software elements that provide reporting, associations, and archiving of sensor data. Development services interface 440 includes hardware and/or software elements that provide an Application Program Interface (API) to collected sensor data and operations of one or more of sensor devices 110. Some examples of API services provided by development services interface 440 include web services, IS services, device management, monitoring interfaces, EPC management, and raw sensor data interfaces.

In one example of operation, sensor devices interface 140 collects sensor data from sensor devices 110 (e.g., RFID readers, RFID tags or labels, temperature sensors, laser diodes, etc.) using device abstraction layer 405. Groups module 410 and local processors 415 filter, clean, and normalize the collected sensor data and forward "relevant" events, such as those that meet predefined criteria or are obtained from a selected device, to internal store/forward interface 420.

The filtered sensor data is then distributed by internal store/forward interface 420 to various distribution systems through dispatch interfaces 425. The unfiltered and/or filters sensor data may further be archived and storage using data management interface 435.

In various embodiments, sensor devices interface 140 provides a system for collection, filtering, and access to sensor data. Sensor devices interface 140 can provide management and monitoring of sensor devices 110 by printing labels, operating sensors, light stacks, message boards, carousels, and the like. In some embodiments, sensor devices interface 140 provides scalability that allows access to sensor data without being tied to one specific vendor application.

Encoding and Decoding of Industrial Identifiers

In various embodiments, system 100 provides encoding and decoding of industrial identifiers. In general, various industries have their own sets of industrial identifiers. Some examples of industrial identifiers are GS1 keys that identify trade names (GTIN), location/trading parties (GLN), logistic units (SSCC), individual assets (GIAI), returnable assets (GRAI), service relationships (GSRN), and document types (GDTI).

GTIN, or Global Trade Item Number, is the GS1 system identifier for trade items, which encompasses both products and services. GTINs provide the capability to deliver unique identification worldwide. The most recognized and used GTIN is the uniform product code (UPC). GLN, or Global Location Number, is the GS1 system identifier for locations, such as legal, functional, and physical entities. Certain distributors, retailers, and trading partners may require a company to identify locations with GLN identification numbers, which are separate and different numbers than UPC numbers.

Typically, techniques for generating and decoding these identifiers using applications have been limited to hand coding the recognition and generation into the applications. With each new code or standard for an identifier added, a new method of recognize and decoding the new code or standard has to be physically incorporated into the applications.

Accordingly, in various embodiments, system 100 provides an engine in language that allows a user or administrator to quickly define new encoding schemes that can be processed by system 100. An encoding and decoding engine (e.g., sensor devices interface 140) may receive an execution tree associated with a plurality of industrial identifiers. The execution tree, in general, specifies how to encode or decode any particular number of industrial identifiers. The engine may receive raw or unstructured data from sensor devices (e.g., RFID readers/interrogators) and use the execution tree to determine the encoding type and other information from the raw data. Thus, the execution tree may specify a number of fields that may be checked within the raw data to determine the encoding scheme. The execution tree may also specify logic or operations to be performed to manipulate the raw data and extract data for the particular fields associated with the encoding scheme.

Alternatively, the engine may receive data from an application or user and a particular encoding scheme to apply to the data. The engine then may generate an industrial identifier based on the data provided by the user or application and the specified encoding scheme using the execution tree. Thus, the execution tree may specify logic and operations to be performed to manipulate data into a format appropriate for a given encoding scheme. The engine then may output an industrial identifier based on the data and encoding scheme provided by the user or application.

Figure 5A:
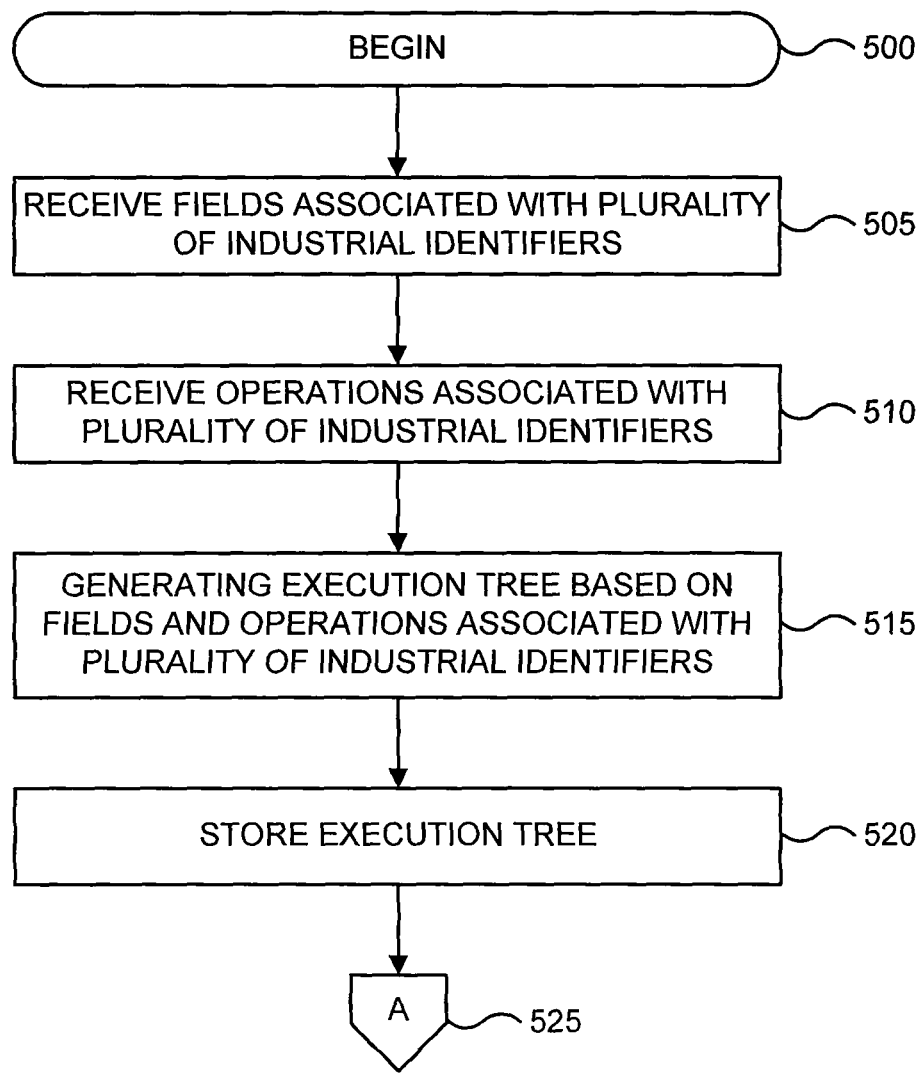
FIGS. 5A and 5B are a simplified flowchart for processing industrial identifiers in one embodiment according to the present invention.
Figure 5B:
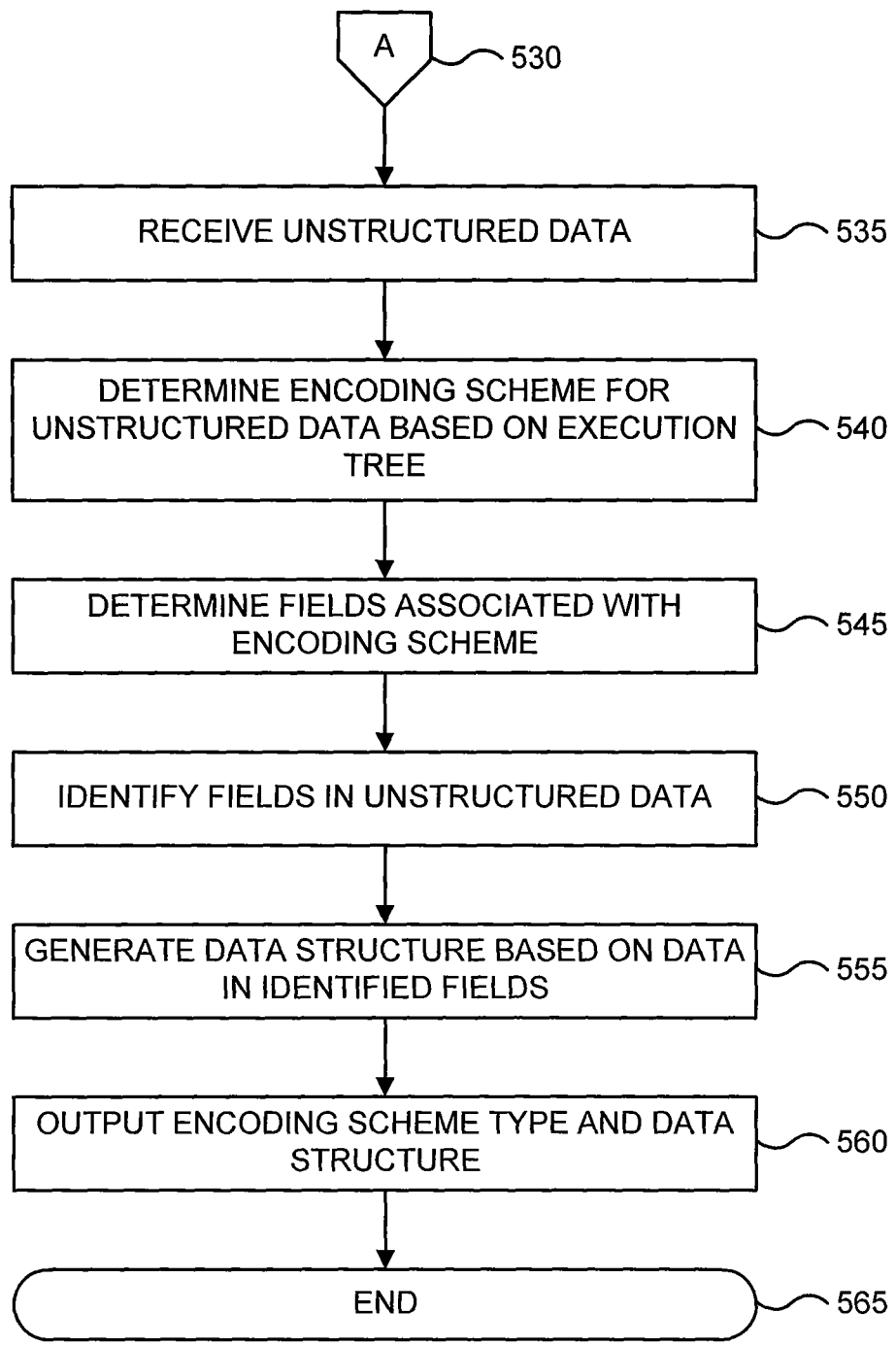

FIGS. 5A and 5B are a simplified flowchart for processing industrial identifiers in one embodiment according to the present invention. The processing depicted in FIGS. 5A and 5B may be performed by software modules (e.g., instructions or code) executed by a processor of a computer system, by hardware modules of the computer system, or combinations thereof. In this example, the processing is performed by sensor devices interface 140. FIG. 5A begins in step 500.

In step 505, sensor devices interface 140 receives one or more fields associated with a plurality of industrial identifiers. A field specifies a portion of data, such as a length, bit width, and the like, associated with a portion of an industrial identifier. The one or more fields may be of variable length or fixed length with respect to one another. Typically, each industrial identifier defines one or more fields, such as headers, checksums, payloads, and the like.

In step 510, sensor devices interface 140 receives one or more operations associated with a plurality of industrial identifiers. Some examples of operations are condition statements, switch statements, arithmetic statements, procedural and function call statements, and the like.

In step 515, sensor devices interface 140 generates an execution tree based on the one or more fields and the one or more operations associated with the plurality of industrial identifiers. In step 520, sensor devices interface stores the execution tree. One example of an execution tree is described further with respect to FIG. 6. One example of a specification for generating an execution tree is described further with respect to FIG. 8. FIG. 5A ends in step 525.

Referring now to FIG. 5B, FIG. 5B begins in step 530. In step 535, sensor devices interface 140 receives unstructured data. In general, sensor devices interface receives raw or unstructured data from sensor devices 110. For example one or more RFID readers may retrieve data from RFID tags. The data in the RFID tags may contain different types of industrial identifiers encoded in an RFID scheme.

In step 540, sensor devices interface 140 determines an encoding scheme for the unstructured data based on the execution tree. For example, sensor devices interface 140 may parse the raw data for header information that matches one or more fields specified in the execution tree. Sensor devices interface 140 may determine that since the data was received from an RFID reader, the data includes an RFID header encoding. Sensor devices interface 140 then may attempt to match the next set of bits or fields after the RFID header to one or more different types of industrial identifiers.

In step 545, sensor devices interface 140 determines one or more fields associated with the identified encoding scheme. The one or more fields associated with the identified encoding scheme may be provided by the execution tree, which specifies for example the bit width of each field of a particular encoding scheme. The execution tree may also define or specify the relative bit lengths, byte lengths, or word lengths associated with a given set of fields.

In step 550, sensor devices interface 140 identifies the fields in the unstructured data. In step 555, sensor devices interface 140 generates a data structure based on the data in the identified fields. In one example, the data structure is the raw data accompanied by metadata segmenting the raw data into one or more fields. Other data structures may be used. In step 560, sensor devices interface 140 outputs the encoding key scheme type and the data structure to an application. A data structure may include the ability to inherently identify the encoding scheme type based on the data structure.

Accordingly, sensor devices interface 140 allows raw data received from sensor devices to be parsed, and encoding schemes identified and decoded using an execution tree. When new or additional encoding schemes are received, the execution tree may simply be updated to include the new encoding schemes. Thus, additional encoding schemes may be incorporated quickly and easily into system 100. Furthermore, existing encoding schemes may be modified using the execution tree for internal use by an application.

Figure 6:
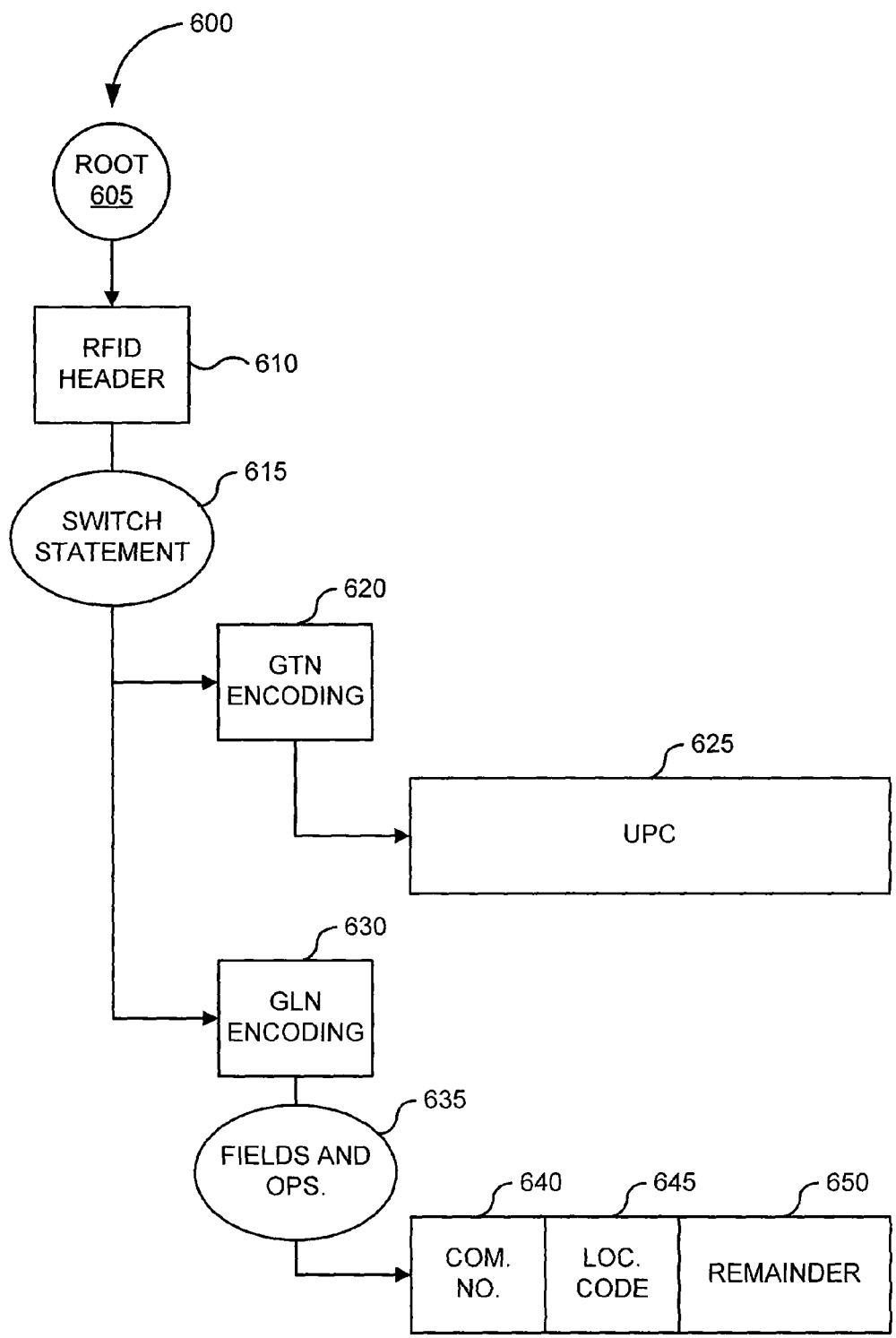
FIG. 6 is a simplified block diagram of an execution tree for processing industrial identifiers in one embodiment according to the present invention.

FIG. 6 is a simplified block diagram of an execution tree 600 for processing industrial identifiers in one embodiment according to the present invention. In this example, execution tree 600 includes a root node 605, an RFID header node 610, a switch statement 615, a GTN encoding note 620, a UPC section 625, a GLN encoding note 630, fields in operations section 635, a company number section 640, a location code section 645, and the remainder section 650.

Execution tree 600 illustrates an encoding and decoding scheme for receiving RFID identifiers, which may include GTN industrial identifiers and/or GLN industrial identifiers. For example, if sensor devices interface 140 receives unstructured data from sensor devices 110, sensor devices interface 140 checks whether a valid RFID header is received using RFID header node 615. RFID header node

615 may specify a bit length or byte length of an expected RFID header, and an expected value that identifies raw data as an RFID identifier.

If a valid RFID header is received, sensor devices interface 140 may determine whether the RFID identifier further includes a GTN identifier or a GLN identifier using switch statement 615. In one example, switch statement 615 defines a bit length or byte length of a field, and an expected value that identifies raw data in the field is either a GTN encoding or a GLN encoding. If the expected value the GTN encoding or the GLN encoding is found, switch statement 615 causes sensor devices interface 140 to further process execution tree 600 at the appropriate encoding note (e.g., GTN encoding node 620 or GLN encoding node 630).

In this example, if sensor devices interface 140 detects a GTN encoding using GTN encoding node 620, sensor devices interface 140 then may identify the remainder of the raw data as a UPC code using UPC section 625.

If sensor devices interface 140 detects a GLN encoding using GLN encoding node 630, sensor devices interface 140 processes the remainder of the data using fields and operations section 635. For example, sensor devices interface 140 extracts a company number 640, a location code 645 and uses the remainder of the data for remainder section 650. Sensor devices interface 140 may generate a data structure based on fields and operations section 635.

In various embodiments, sensor devices interface 140 uses execution tree 600 to not only determine an encoding scheme in identified fields associated with the identified encoding scheme from raw data, sensor devices interface 140 also uses execution tree 600 to generate GTL an identifiers in GLN identifiers that can be encapsulated in an RFID payload and written to an RFID tag. One example of this is described further with respect to FIG. 7.

Additionally, in various embodiments, a root reference may be provided for identifying the starting location or position to be executed by sensor devices interface 140. In general a root reference indicates where or which node in the execution tree to begin processing either for an encoding process or a decoding process. For example, sensor devices interface 140 may received a root reference indicating to begin decoding of raw data at GTN encoding node 620. In another example, sensor devices interface 140 may receive a root reference indicating to begin encoding of data provided by a user or application at GLN encoding node 630. Accordingly, sensor devices interface 140 does not have to process the entire execution tree 600, which may include hundreds to thousands of industrial identifier encodings.

Figure 7:
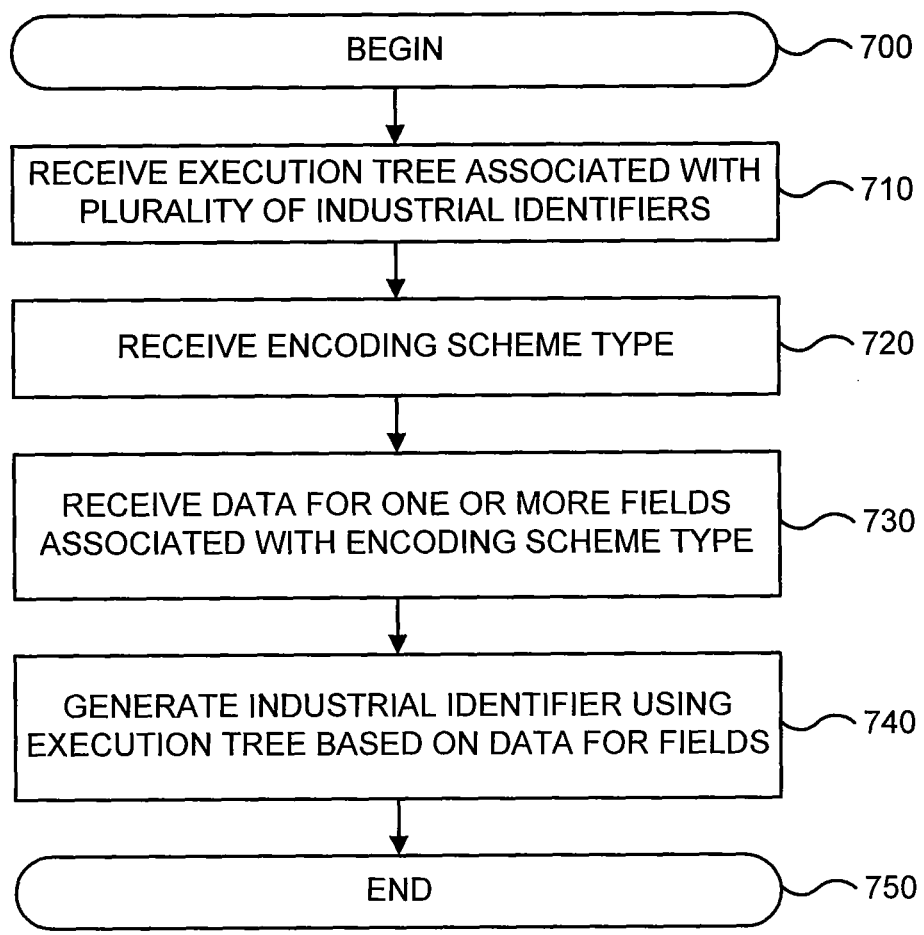
FIG. 7 is a simplified flowchart for generating an industrial identifier using an execution tree in one embodiment according to the present invention.

FIG. 7 is a simplified flowchart for generating an industrial identifier using an execution tree in one embodiment according to the present invention. FIG. 7 begins in step 700.

In step 710, sensor devices interface 140 receives an execution tree (e.g., execution tree 600 of FIG. 6) associated with a plurality of industrial identifiers. For example, execution tree 600 is associated with GTN identifiers and GLN identifiers.

In step 720, sensor devices interface 140 receives an encoding scheme type. For example, a user or computer process may send a particular encoding scheme type, such as GTN or GLN, for which the user or computer process wishes to use for encoding data. In step 730, sensor devices interface receives data for one or more fields associated with the encoding scheme type. For example, if the user wishes to encode a GLN identifier, the user provides a company number, a location code, and other data.

In step 740, sensor devices interface 140 generates an industrial identifier using the execution tree based on the data for the one or more fields. For example, using execution tree 600, sensor devices interface 140 generates an RFID header using RFID header node 610, and appends to the RFID header GLN encoded data that has been formatted according to fields in operations section 635. Sensor devices interface 140 then may return the industrial identifier to the user or application, or send the industrial identifier 21 or more of sensor devices 110 can be written or printed to an RFID tag. FIG. 7 ends in step 750.

FIG. 8 represents one example of a specification 800 for generating an execution tree for processing industrial identifiers in one embodiment according to the present invention. In this example, specification 800 includes a version identifier 805 and an "encodings" section 810. Encodings section 810 includes definitions for encoding 815, encoding 820, encoding 825, and a dictionary section 830. In this example, specification 800 is written in the Extensible Markup Language (XML). Other markup languages, scripted or complied languages may be used to generate the one or more statements that define encodings section 810 to include definitions for encoding 815, encoding 820, encoding 825, and dictionary section 830.

Encoding 815 is identified as a "root" encoding associated with an input field of 128 raw bits. Root encoding 815 includes a header section 835 for checking the value of the first 2 bits of the 128 raw bits. In this example, a switch statement is used to provide various cases for matching the 2-bit header. If the value of the 2 bits is "10," (e.g., base 2) then specification 800 directs processing using a "GOTO" statement to an encoding definition labeled "SGTIN-64."

All other values associated with the header indicated by a "*" wildcard for the first 2 bits direct processing to check for a longer 8-bit header. In this example, again a switch statement is used to provide various cases for matching the 8-bit header. In one example, if an 8-bit header matches the value or mask of "00110101," then specification 800 directs processing to an encoding definition labeled "GID-96." Other case statements may be included. In addition, a default or catch all statement, such as indicated by a "*" wildcard may be included. In this example, and error message can be displayed indicating that no matching headers were found.

Encoding 820 provides a particular definition for a "GID-96" type identifier. For example, encoding 820 may include a name attribute (e.g., name='GID-96'), a length attribute (e.g., length='96'), uniform resource name (URN) attribute (e.g., URN='urn:epc:id:gid:%company%.%class%.%serial%'), and an inputfields attribute (e.g., inputFields='company,class,serial'. Input fields 850 are associated with the inputfields attribute. For example, input fields 850 includes one or more variables identified as a name and a length (e.g. <var name='company' length='28'/>).

Dictionary 830 includes one or more operations, such as translations or manipulations of data. For example, standards section 855 includes one or more translations between input fields or data fields (e.g., <supplier>company</supplier>).

The following is an expanded view of specification 800. The following is merely one example, and is not intended to be limiting in any manner.

```xml
<?xml version='1.0'?>
<encodings defaultRoot="root">
    <!-- Header ================================================ -->
    <encoding name="root" inputFields='raw:128'>
        <!-- Check 2 bit headers -->
        <var name='header' length='2'/>
        <switch name='header'>
            <case value='10'>
                <goto label='SGTIN-64'/>
            </case>
            <case value='*'>
                <!-- Now check long header -->
                <var name='header' offset='0' length='8'/>
                <switch name='header'>
                    <case value='00110101'>
                        <goto label='GID-96'/>
                    </case>
                    <case value='00110000'>
                        <goto label='SGTIN-96'/>
                    </case>
                    <case value='00001000'>
                        <goto label='SSCC-64'/>
                    </case>
                    <case value='00110001'>
                        <goto label='SSCC-96'/>
                    </case>
                    <case value='00001001'>
                        <goto label='SGLN-64'/>
                    </case>
                    <case value='00110010'>
                        <goto label='SGLN-96'/>
                    </case>
                    <case value='00001010'>
                        <goto label='GRAI-64'/>
                    </case>
                    <case value='00110011'>
                        <goto label='GRAI-96'/>
                    </case>
                    <case value='00001011'>
                        <goto label='GIAI-64'/>
                    </case>
                    <case value='00110100'>
                        <goto label='GIAI-96'/>
                    </case>
                    <case value='11001110'>
                        <goto label='DOD-64'/>
                    </case>
                    <case value='00101111'>
                        <goto label='DOD-96'/>
                    </case>
                    <case value='*'>
                        <error message='No matching header'/>
                    </case>
                </switch>
            </case>
        </switch>
    </encoding>
    <!-- Encoding ================================================ -->
    <encoding name='GID-96' length='96'
urn='urn:epc:id:gid:%company%.%class%.%serial%' inputFields='company,class,serial'>
        <encodeVar name='header' value='00110101' />
        <var name='company' length='28'/>
        <var name='class' length='24'/>
        <var name='serial' length='30'/>
    </encoding>
    <encoding name='SGTIN-64' length='64' urn='urn:epc:id:sgtin-64:%company%.%class%.%serial%' inputFields='filter,company,class,serial'>
        <encodeVar name='header' value='10' />
        <var name='filter' length='3'/>
        <var name='company' length='14'/>
        <var name='class' length='20'/>
        <var name='serial' length='25'/>
    </encoding>
    <encoding name='SGTIN-96' length='96' urn='urn:epc:id:sgtin-96:%filter%.%company%.%class%.%serial%'
inputFields='filter,partition,company,class,serial'>
        <encodeVar name='header' value='00110000' />
        <var name='filter' length='3'/>
        <var name='partition' length='3'/>
        <switch name='partition'>
            <case value='000'>
```

-continued

```
                <var name='company' length='40'/>
                <var name='class' length='4'/>
            </case>
            <case value='001'>
                <var name='company' length='37'/>
                <var name='class' length='7'/>
            </case>
            <case value='010'>
                <var name='company' length='34'/>
                <var name='class' length='10'/>
            </case>
            <case value='011'>
                <var name='company' length='30'/>
                <var name='class' length='14'/>
            </case>
            <case value='100'>
                <var name='company' length='27'/>
                <var name='class' length='17'/>
            </case>
            <case value='101'>
                <var name='company' length='24'/>
                <var name='class' length='20'/>
            </case>
            <case value='110'>
                <var name='company' length='20'/>
                <var name='class' length='24'/>
            </case>
        </switch>
        <var name='serial' length='38'/>
    </encoding>
    <encoding name='SSCC-64' length='64' urn='urn:epc:id:sscc-64:%company%.%serial%' inputFields='filter,company,serial'>
        <encodeVar name='header' value='00001000' />
        <var name='filter' length='3'/>
        <var name='company' length='14'/>
        <var name='serial' length='39'/>
    </encoding>
    <encoding name='SSCC-96' length='96' urn='urn:epc:id:sscc-96:%filter%.%company%.%serial%' inputFields='filter,partition,company,serial'>
        <encodeVar name='header' value='00110001' />
        <var name='filter' length='3'/>
        <var name='partition' length='3'/>
        <switch name='partition'>
            <case value='000'>
                <var name='company' length='40'/>
                <var name='serial' length='18'/>
            </case>
            <case value='001'>
                <var name='company' length='37'/>
                <var name='serial' length='21'/>
            </case>
            <case value='010'>
                <var name='company' length='34'/>
                <var name='serial' length='24'/>
            </case>
            <case value='011'>
                <var name='company' length='30'/>
                <var name='serial' length='28'/>
            </case>
            <case value='100'>
                <var name='company' length='27'/>
                <var name='serial' length='31'/>
            </case>
            <case value='101'>
                <var name='company' length='24'/>
                <var name='serial' length='34'/>
            </case>
            <case value='110'>
                <var name='company' length='20'/>
                <var name='serial' length='38'/>
            </case>
        </switch>
    </encoding>
    <encoding name='SGLN-64' length='64' urn='urn:epc:id:sgln-64:%company%.%class%.%serial%' inputFields='filter,company,class,serial'>
        <encodeVar name='header' value='00001001' />
        <var name='filter' length='3'/>
        <var name='company' length='14'/>
        <var name='location' length='20'/>
```

-continued

```
            <var name='serial' length='19'/>
        </encoding>
        <encoding name='SGLN-96' length='96' urn='urn:epc:id:sgln-
96:%filter%.%company%.%class%.%serial%' inputFields='filter,partition,company,class'>
            <encodeVar name='header' value='00110010' />
            <var name='filter' length='3'/>
            <var name='partition' length='3'/>
            <switch name='partition'>
                <case value='000'>
                    <var name='company' length='40'/>
                    <var name='location' length='1'/>
                </case>
                <case value='001'>
                    <var name='company' length='37'/>
                    <var name='location' length='4'/>
                </case>
                <case value='010'>
                    <var name='company' length='34'/>
                    <var name='location' length='7'/>
                </case>
                <case value='011'>
                    <var name='company' length='30'/>
                    <var name='location' length='11'/>
                </case>
                <case value='100'>
                    <var name='company' length='27'/>
                    <var name='location' length='14'/>
                </case>
                <case value='101'>
                    <var name='company' length='24'/>
                    <var name='location' length='17'/>
                </case>
                <case value='110'>
                    <var name='company' length='20'/>
                    <var name='location' length='21'/>
                </case>
            </switch>
            <var name='serial' length='41'/>
        </encoding>
        <encoding name='GRAI-64' length='64' urn='urn:epc:id:grai-
64:%company%.%class%.%serial%' inputFields='filter,company,class,serial'>
            <encodeVar name='header' value='00001010' />
            <var name='filter' length='3'/>
            <var name='company' length='14'/>
            <var name='class' length='20'/>
            <var name='serial' length='19'/>
        </encoding>
        <encoding name='GRAI-96' length='96' urn='urn:epc:id:grai-
96:%filter%.%company%.%class%.%serial%' inputFields='filter,partition,company,class'>
            <encodeVar name='header' value='00110011' />
            <var name='filter' length='3'/>
            <var name='partition' length='3'/>
            <switch name='partition'>
                <case value='000'>
                    <var name='company' length='40'/>
                    <var name='class' length='4'/>
                </case>
                <case value='001'>
                    <var name='company' length='37'/>
                    <var name='class' length='7'/>
                </case>
                <case value='010'>
                    <var name='company' length='34'/>
                    <var name='class' length='10'/>
                </case>
                <case value='011'>
                    <var name='company' length='30'/>
                    <var name='class' length='14'/>
                </case>
                <case value='100'>
                    <var name='company' length='27'/>
                    <var name='class' length='17'/>
                </case>
                <case value='101'>
                    <var name='company' length='24'/>
                    <var name='class' length='20'/>
                </case>
                <case value='110'>
                    <var name='company' length='20'/>
```

-continued

```
                    <var name='class' length='24'/>
                </case>
            </switch>
            <var name='serial' length='38'/>
        </encoding>
        <encoding name='GIAI-64' length='64' urn='urn:epc:id:giai-
64:%company%.%class%' inputFields='filter,company,class,serial'>
            <encodeVar name='header' value='00001011' />
            <var name='filter' length='3'/>
            <var name='company' length='14'/>
            <var name='class' length='39'/>
        </encoding>
        <encoding name='GIAI-96' length='96' urn='urn:epc:id:giai-
96:%filter%.%company%.%class%.%serial%'
inputFields='filter,partition,company,class,serial'>
            <encodeVar name='header' value='00110100' />
            <var name='filter' length='3'/>
            <var name='partition' length='3'/>
            <switch name='partition'>
                <case value='000'>
                    <var name='company' length='40'/>
                    <var name='class' length='42'/>
                </case>
                <case value='001'>
                    <var name='company' length='37'/>
                    <var name='class' length='45'/>
                </case>
                <case value='010'>
                    <var name='company' length='34'/>
                    <var name='class' length='48'/>
                </case>
                <case value='011'>
                    <var name='company' length='30'/>
                    <var name='class' length='52'/>
                </case>
                <case value='100'>
                    <var name='company' length='27'/>
                    <var name='class' length='55'/>
                </case>
                <case value='101'>
                    <var name='company' length='24'/>
                    <var name='class' length='58'/>
                </case>
                <case value='110'>
                    <var name='company' length='20'/>
                    <var name='class' length='62'/>
                </case>
            </switch>
        </encoding>
        <encoding name='DOD-64' length='64'
urn='urn:epc:id:usdod:%cage%.%serial%' inputFields='cage,serial'>
            <encodeVar name='header' value='11001110' />
            <var name='filter' length='2'/>
            <var name='cage' length='30'/>
            <var name='serial' length='24'/>
        </encoding>
        <encoding name='DOD-96' length='96'
urn='urn:epc:id:usdod:%cage%.%serial%' inputFields='cage,serial'>
            <encodeVar name='header' value='00101111' />
            <var name='filter' length='4'/>
            <var name='cage' length='48'/>
            <var name='serial' length='36'/>
        </encoding>
    <!-- Encoding metadata for encoding translations and compliance operations -->
    <dictionary>
        <standard name='DOD-[\d]+' serialUses='supplier'>
            <supplier>cage</supplier>
            <serial>serial</serial>
            <tt>filter</tt>
            <ttmap>
                <unit>10</unit>
                <case>01</case>
                <pallet>00</pallet>
                <shipment>00</shipment>
                <reserved>11</reserved>
            </ttmap>
        </standard>
        <standard name='SGTIN-[\d]+' serialUses='supplier,product'>
            <supplier>company</supplier>
```

```
                <product>class</product>
                <serial>serial</serial>
                <tt>filter</tt>
                <ttmap>
                        <unit>001</unit>
                        <case>010</case>
                        <pallet>011</pallet>
                        <shipment>011</shipment>
                        <reserved>111</reserved>
                </ttmap>
        </standard>
        <standard name='SSCC-[\d]+' serialUses='supplier'>
                <supplier>company</supplier>
                <serial>serial</serial>
                <tt>filter</tt>
                <ttmap>
                        <unit>000</unit>
                        <case>000</case>
                        <pallet>010</pallet>
                        <shipment>010</shipment>
                        <reserved>111</reserved>
                </ttmap>
        </standard>
        <standard name='SGLN-[\d]+' serialUses='supplier'>
                <supplier>company</supplier>
                <supplier>location</supplier>
                <serial>serial</serial>
                <tt>filter</tt>
                <ttmap>
                        <unit>000</unit>
                        <case>000</case>
                        <pallet>000</pallet>
                        <shipment>000</shipment>
                        <reserved>111</reserved>
                </ttmap>
        </standard>
        <standard name='GRAI-[\d]+' serialUses='supplier,product'>
                <supplier>company</supplier>
                <product>class</product>
                <serial>serial</serial>
                <tt>filter</tt>
                <ttmap>
                        <unit>000</unit>
                        <case>000</case>
                        <pallet>000</pallet>
                        <shipment>000</shipment>
                        <reserved>111</reserved>
                </ttmap>
        </standard>
        <standard name='GIAI-[\d]+' serialUses='supplier,product'>
                <supplier>company</supplier>
                <product>class</product>
                <serial>serial</serial>
                <tt>filter</tt>
                <ttmap>
                        <unit>000</unit>
                        <case>000</case>
                        <pallet>000</pallet>
                        <shipment>000</shipment>
                        <reserved>111</reserved>
                </ttmap>
        </standard>
        <standard name='GID-[\d]+' serialUses='supplier,product'>
                <supplier>company</supplier>
                <product>class</product>
                <serial>serial</serial>
        </standard>
    </dictionary>
</encodings>
```

As described above, system 100 provides encoding and decoding of industrial identifiers. This allows new encodings an additional encodings to be quickly specified in integrated into system 100. Using system 100, a user can rapidly develop new encoding schemes using an execution tree. By providing a specification of an encoding, a user can quickly define one or more fields associated with an encoding type and one or more operations or procedures to manipulate data either retrieved from sensor devices 110 or provided to sensor devices interface 140 generate the encoding.

Figure 9:
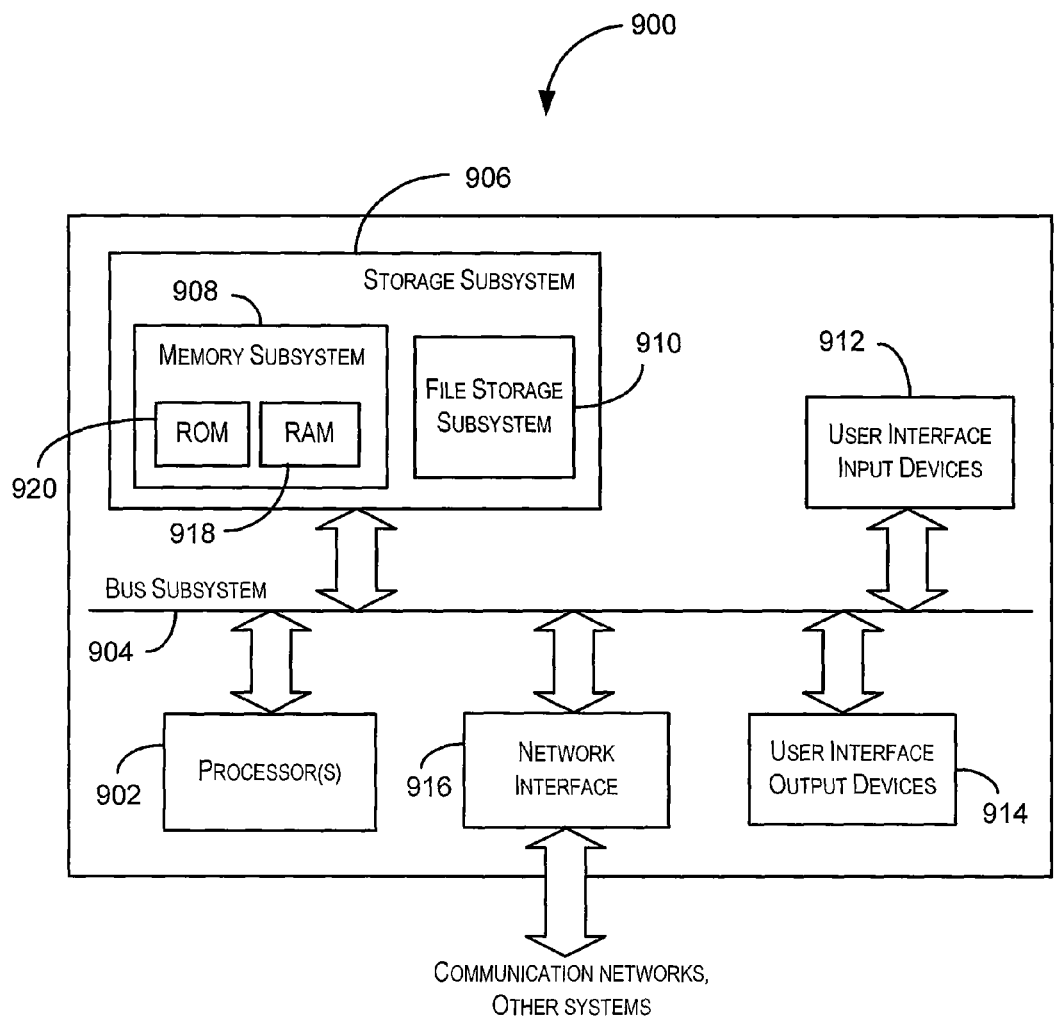
FIG. 9 is a simplified block diagram of a computer system that may be used to practice embodiments of the present invention.

FIG. 9 is a simplified block diagram of a computer system 900 that may be used to practice embodiments of the present invention. As shown in FIG. 9, computer system 900 includes a processor 902 that communicates with a number of peripheral devices via a bus subsystem 904. These peripheral devices may include a storage subsystem 906, comprising a memory subsystem 908 and a file storage subsystem 910, user interface input devices 912, user interface output devices 914, and a network interface subsystem 916.

Bus subsystem 904 provides a mechanism for letting the various components and subsystems of computer system 900 communicate with each other as intended. Although bus subsystem 904 is shown schematically as a single bus, alternative embodiments of the bus subsystem may utilize multiple busses.

Network interface subsystem 916 provides an interface to other computer systems, and networks, and devices. Network interface subsystem 916 serves as an interface for receiving data from and transmitting data to other systems from computer system 900.

User interface input devices 912 may include a keyboard, pointing devices such as a mouse, trackball, touchpad, or graphics tablet, a scanner, a barcode scanner, a touchscreen incorporated into the display, audio input devices such as voice recognition systems, microphones, and other types of input devices. In general, use of the term "input device" is intended to include all possible types of devices and mechanisms for inputting information to computer system 900.

User interface output devices 914 may include a display subsystem, a printer, a fax machine, or non-visual displays such as audio output devices, etc. The display subsystem may be a cathode ray tube (CRT), a flat-panel device such as a liquid crystal display (LCD), or a projection device. In general, use of the term "output device" is intended to include all possible types of devices and mechanisms for outputting information from computer system 900.

Storage subsystem 906 may be configured to store the basic programming and data constructs that provide the functionality of the present invention. Software (code modules or instructions) that provides the functionality of the present invention may be stored in storage subsystem 906. These software modules or instructions may be executed by processor(s) 902. Storage subsystem 906 may also provide a repository for storing data used in accordance with the present invention. Storage subsystem 906 may comprise memory subsystem 908 and file/disk storage subsystem 910.

Memory subsystem 908 may include a number of memories including a main random access memory (RAM) 918 for storage of instructions and data during program execution and a read only memory (ROM) 920 in which fixed instructions are stored. File storage subsystem 910 provides persistent (non-volatile) storage for program and data files, and may include a hard disk drive, a floppy disk drive along with associated removable media, a Compact Disk Read Only Memory (CD-ROM) drive, a DVD, an optical drive, removable media cartridges, and other like storage media.

Computer system 900 can be of various types including a personal computer, a portable computer, a workstation, a network computer, a mainframe, a kiosk, or any other data processing system. Due to the ever-changing nature of computers and networks, the description of computer system 900 depicted in FIG. 9 is intended only as a specific example for purposes of illustrating the preferred embodiment of the computer system. Many other configurations having more or fewer components than the system depicted in FIG. 9 are possible.

Although specific embodiments of the invention have been described, various modifications, alterations, alternative constructions, and equivalents are also encompassed within the scope of the invention. The described invention is not restricted to operation within certain specific data processing environments, but is free to operate within a plurality of data processing environments. Additionally, although the present invention has been described using a particular series of transactions and steps, it should be apparent to those skilled in the art that the scope of the present invention is not limited to the described series of transactions and steps.

Further, while the present invention has been described using a particular combination of hardware and software, it should be recognized that other combinations of hardware and software are also within the scope of the present invention. The present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention as set forth in the claims.

What is claimed is:

1. A method comprising:
   receiving, at one or more computer systems, a sequence of a plurality of bits generated by one or more sensor devices;
   receiving, at the one or more computer systems, data defining an execution tree, the execution tree comprising a plurality of decision branches including a first decision branch for decoding data according to a first GS1 key and a second decision branch for decoding data according to a second GS1 key;
   comparing two or more different series of bits having varying lengths within the sequence of the plurality of bits to at least a first value specified in a first node in the first decision branch of the execution tree and a second value specified in a second node in the second decision branch of the execution tree;
   responsive to comparing the two or more different series of bits having varying lengths within the sequence of the plurality of bits to at least a first value specified in the first node in the first decision branch of the execution tree and the second value specified in the second node in the second decision branch of the execution tree, identifying a target GS1 key, the target GS1 key being one of the first GS1 key or the second GS1 key;
   determining, with one or more processors associated with the one or more computer systems, one or more field definitions associated with the target GS1 key from the execution tree; and
   generating, with the one or more processors associated with the one or more computer systems, a data structure based on the one or more field definitions associated with the target GS1 key and at least a subset of bits within the sequence of the plurality of bits; and
   storing the data structure in a storage device associated with the one or more computer systems hosting a processing engine.

2. The method of claim 1 wherein generating, with the one or more processors associated with the one or more computer systems, the data structure comprises generating the data structure based on one or more data manipulation operations that manipulate a predetermined portion of the sequence of a plurality of bits.

3. The method of claim 1 wherein generating, with the one or more processors associated with the one or more computer systems, the data structure comprises generating the data structure based on one or more data comparison operations that compare at least one portion of the sequence of the plurality of bits with another portion of the sequence of the plurality of bits.

4. The method of claim 1 wherein generating, with the one or more processors associated with the one or more computer systems, the data structure comprises generating the data structure as an industrial identifier associated with trade names (GTIN), location/trading parties (GLN), logistic units (SSCC), individual assets (GIAI), returnable assets (GRAI), service relationships (GSRN), or document types (GDTI) encoding schemes.

5. The method of claim 1 further comprising:
receiving, at the one or more computer systems, information declaring how information is determined to be encoded or decoded according to the target GS1 key;
receiving, at the one or more computer systems, information declaring how information determined to be encoded or decoded according to the target GS1 key is arranged in one or more fields; and
generating, with the one or more processors associated with the one or more computer systems, a textual specification based on the information declaring how information is determined to be encoded or decoded according to the target GS1 key and the information declaring how information determined to be encoded or decoded according to the target GS1 key is arranged in one or more fields.

6. The method of claim 5 wherein the textual specification comprises an XML document.

7. A non-transitory computer-readable medium storing computer-executable code for processing industrial identifiers received from sensor devices, the non-transitory computer-readable medium comprising:
code for receiving a sequence of a plurality of bits generated by one or more sensors devices;
code for receiving, at one or more computer systems, data defining an execution tree, the execution tree comprising a plurality of decision branches including a first decision branch for decoding data according to a first GS1 key and a second decision branch for decoding data according to a second GS1 key;
code for comparing two or more different series of bits having varying lengths within the sequence of the plurality of bits to at least a first value specified in a first node in the first decision branch of the execution tree and a second value specified in a second node in the second decision branch of the execution tree;
code for identifying a target GS1 key responsive to comparing the two or more different series of bits having varying lengths within the sequence of the plurality of bits to at least a first value specified in the first node in the first decision branch of the execution tree and the second value specified in the second node in the second decision branch of the execution tree, the target GS1 key being one of the first GS1 key or the second GS1 key;
code for determining one or more field definitions associated with the target GS1 key from the execution tree;
code for generating a data structure based on the one or more field definitions associated with the target GS1 key and at least a subset of bits within the sequence of the plurality of bits; and
code for communicating the data structure to an application.

8. The non-transitory computer-readable medium of claim 7 wherein the code for generating the data structure comprises code for generating the data structure based on one or more data manipulation operations that manipulate a predetermined portion of the sequence of a plurality of bits.

9. The non-transitory computer-readable medium of claim 7 wherein the code for generating the data structure comprises code for generating the data structure based on one or more data comparison operations that compare at least one portion of the sequence of the plurality of bits with another portion of the sequence of the plurality of bits.

10. The non-transitory computer-readable medium of claim 7 wherein the code for generating the data structure comprises code for generating the data structure as an industrial identifier associated with trade names (GTIN), location/trading parties (GLN), logistic units (SSCC), individual assets (GIAI), returnable assets (GRAI), service relationships (GSRN), or document types (GDTI) encoding schemes.

11. The non-transitory computer-readable medium of claim 7 further comprising:
code for receiving information declaring how information is determined to be encoded or decoded according to the target GS1 key;
code for receiving information declaring how information determined to be encoded or decoded according to the target GS1 key is arranged in one or more fields; and
code for generating a textual specification based on the information declaring how information is determined to be encoded or decoded according to the target GS1 key and the information declaring how information determined to be encoded or decoded according to the target GS1 key is arranged in one or more fields.

12. The non-transitory computer-readable medium of claim 11 wherein the textual specification comprises an XML document.

13. A system for processing industrial identifiers received from sensor devices, the system comprising:
a processor; and
a memory storing instructions which when executed by the processor configure the processor to:
receive a sequence of a plurality of bits generated by one or more sensors devices;
receive data defining an execution tree, the execution tree comprising a plurality of decision branches including a first decision branch for decoding data according to a first GS1 key and a second decision branch for decoding data according to a second GS1 key;
compare two or more different series of bits having varying lengths within the sequence of the plurality of bits to at least a first value specified in a first node in the first decision branch of the execution tree and a second value specified in a second node in the second decision branch of the execution tree;
responsive to comparing the two or more different series of bits having varying lengths within the sequence of the plurality of bits to at least a first value specified in the first node in the first decision branch of the execution tree and the second value specified in the second node in the second decision branch of the execution tree, identify a target GS1 key, the target GS1 key being one of the first GS1 key or the second GS1 key;
determine one or more field definitions associated with the target GS1 key from the execution tree;

generate a data structure based on the one or more field definitions associated with the target GS1 key and at least a subset of bits within the sequence of the plurality of bits; and communicate the data structure to an application.

14. The system of claim 13 wherein to generate the data structure the processor is further configured to generate the data structure based on one or more data manipulation operations that manipulate a predetermined portion of the sequence of a plurality of bits.

15. The system of claim 13 wherein to generate the data structure the processor is further configured to generate the data structure based on one or more data comparison operations that compare at least one portion of the sequence of the plurality of bits with another portion of the sequence of the plurality of bits.

16. The system of claim 13 wherein to generate the data structure the processor is further configured to generate the data structure as an industrial identifier associated with trade names (GTIN), location/trading parties (GLN), logistic units (SSCC), individual assets (GIAI), returnable assets (GRAI), service relationships (GSRN), or document types (GDTI) encoding schemes.

17. The system of claim 13 wherein the processor is further configured to:

receive information declaring how information is determined to be encoded or decoded according to the target GS1 key;

receive information declaring how information determined to be encoded or decoded according to the target GS1 key is arranged in one or more fields; and generate a textual specification based on the information declaring how information is determined to be encoded or decoded according to the target GS1 key and the information declaring how information determined to be encoded or decoded according to the target GS1 key is arranged in one or more fields.

18. The system of claim 17 wherein the textual specification comprises an XML document.

19. The method of claim 1, further comprising:

receiving a root reference identifying a starting node in the execution tree; and responsive at least to receiving the root reference, beginning decoding the sequence of the plurality of bits at the starting node identified by the root reference.

20. The method of claim 19, wherein the root reference identifies, as the starting node, a GT1 encoding node that is different than a root node defined by the execution tree.

21. The method of claim 1, wherein the first value is a two-bit header value and the second value is an eight-bit header value.

* * * * *